United States Patent
Crass et al.

(10) Patent No.: US 6,344,733 B1
(45) Date of Patent: Feb. 5, 2002

(54) PORTABLE JUMP-STARTING BATTERY PACK WITH CHARGE MONITORING SYSTEM

(75) Inventors: Matthew M. Crass, Pleasant Prairie; Robert W. Iverson, Oak Creek, both of WI (US)

(73) Assignee: Snap-on Technologies, Inc., Lincolnshire, IL (US)

( * ) Notice: Subject to any disclaimer, the term of this patent is extended or adjusted under 35 U.S.C. 154(b) by 23 days.

(21) Appl. No.: 09/663,694

(22) Filed: Sep. 22, 2000

Related U.S. Application Data

(60) Provisional application No. 60/179,180, filed on Jan. 31, 2000.

(51) Int. Cl.[7] .................................................. H02J 7/14
(52) U.S. Cl. ........................ 320/143; 320/145; 320/158
(58) Field of Search .................................. 320/137, 162, 320/152, 158, 143, 145; 702/63

(56) References Cited

U.S. PATENT DOCUMENTS

| | | |
|---|---|---|
| 4,449,089 A | 5/1984 | Winkler |
| 4,476,425 A * | 10/1984 | Chernotsky et al. ........ 320/143 |
| 4,583,034 A | 4/1986 | Martin |
| 4,583,035 A | 4/1986 | Sloan |
| 5,325,041 A | 6/1994 | Briggs |
| 5,371,455 A | 12/1994 | Chen |
| 5,396,163 A | 3/1995 | Nor et al. |
| 5,510,694 A | 4/1996 | Nilssen |
| 5,581,170 A | 12/1996 | Mammano et al. |
| 5,646,507 A | 7/1997 | Timmons et al. |
| 5,684,382 A | 11/1997 | Fritz et al. |
| 5,694,024 A | 12/1997 | Dias et al. |
| 5,710,501 A | 1/1998 | van Phuoc et al. |
| 5,739,668 A | 4/1998 | Nishikiori |
| 5,754,027 A | 5/1998 | Oglesbee et al. |
| 5,793,185 A | 8/1998 | Prelec et al. |
| 5,804,945 A | 9/1998 | Sato et al. |
| 5,818,201 A | 10/1998 | Stockstad et al. |
| 5,861,730 A | 1/1999 | Lee |
| 5,872,444 A | 2/1999 | Nagano et al. |
| 5,896,024 A | 4/1999 | Bradus et al. |
| 5,969,502 A * | 10/1999 | Beard .......................... 320/116 |
| 6,025,695 A | 2/2000 | Friel et al. |
| 6,239,579 B1 * | 5/2001 | Dunn et al. .................. 320/121 |

* cited by examiner

Primary Examiner—Gregory J Toatley, Jr.
(74) Attorney, Agent, or Firm—Seyfarth Shaw

(57) ABSTRACT

A battery pack includes a lead-acid battery and a charger port and an electronic switch connected between the two, the switch being controlled by a microcontroller which is connected to each of the battery and the charger port for separately monitoring the voltages thereat. The microcontroller operates under the control of a program which includes routines for comparing the battery voltage to the charger port voltage, for preventing closure of the switch unless the charger port voltage is at least a predetermined level and at least the battery voltage, for adjusting the duty cycle of the switch in accordance with the magnitude of the difference between the charger port voltage and the battery voltage, for detecting a bad battery by measuring the length of time required to increase the battery voltage from first to second predetermined levels, for reducing the switch duty cycle to a trickle charge level in the event of bad battery detection, and for disabling the bad battery detection routine in the event that a cigarette lighter adapter is coupled to the charger port. Audible and visible indicators may be provided to signal charging condition.

12 Claims, 4 Drawing Sheets

US 6,344,733 B1

PORTABLE JUMP-STARTING BATTERY PACK WITH CHARGE MONITORING SYSTEM

RELATED APPLICATION

This application claims the benefit of the filing date of copending U.S. Provisional Application No. 60/179,180, filed Jan. 31, 2000.

BACKGROUND

This application relates to battery or power packs of the rechargeable type and, in particular to lead-acid, thin metal film battery packs. The application relates to monitoring the voltage of the storage battery of the battery pack as well as the voltage provided by an associated charger coupled to the battery pack.

It is known to provide battery packs, i.e., compact arrangements of one or more battery cells, for various DC battery power delivery applications. One such application is for use in jump-starting automotive vehicles. Such battery packs typically use lead-acid battery cells, some of which have recently been of the thin metal film type. Such thin metal film lead-acid battery cells are sold, for example, by Johnson Controls, Inc. under the designation "Inspira" and by Bolder Technologies under the designation "Bolder 9/5 Sub-C TMF" (Thin Metal Film).

Prior jump-starting battery packs have been provided with LED status lights. A battery pack sold by Bolder Technologies under the designation "Bolder SecureStart Instant Engine Starter" includes a low battery voltage alert beeper, as well as LED indicators of battery voltage level. These indicators operate automatically when the battery pack is connected to a charger and are otherwise pushbutton-activated. However, the prior units do not provide any means for determining an overvoltage charging condition, or for automatically determining whether or not the battery is properly accepting a charge. If the system is being charged it is up to the operator to periodically check the battery voltage condition and to keep track of how long the battery has been charging without reaching a fully-charged condition and, if too long, to manually disconnect the charger or take other appropriate action. Furthermore, prior systems do not tailor the charging rate to the condition of the battery.

SUMMARY

This application discloses an improved monitoring circuit for use with jump-starting battery packs, which avoids the disadvantages of prior such circuits while affording additional structural and operating advantages.

An important aspect is the provision of a monitoring circuit for a jump-starting battery pack which is fully automatic.

In connection with the foregoing aspect, another aspect is the provision of a monitoring circuit of the type set forth, which monitors not only the battery voltage, but also the voltage at a charger input port.

Still another aspect is the provision of a monitoring circuit of the type set forth, which automatically recognizes a failed battery.

Still another aspect is the provision of a monitoring circuit of the type set forth, which will alert a user if the battery voltage is too high and will automatically adjust the charging rate in accordance with the difference between charging voltage and battery voltage.

Still another aspect is the provision of a monitoring circuit of the type set forth which is powered by the storage battery of the battery pack being monitored, without significantly loading that battery.

BRIEF DESCRIPTION OF THE DRAWINGS

For the purpose of facilitating an understanding of the subject matter sought to be protected, there is illustrated in the accompanying drawings an embodiment thereof, from an inspection of which, when considered in connection with the following description, the subject matter sought to be protected, its construction and operation, and many of its advantages should be readily understood and appreciated.

DETAILED DESCRIPTION

Figure 1:
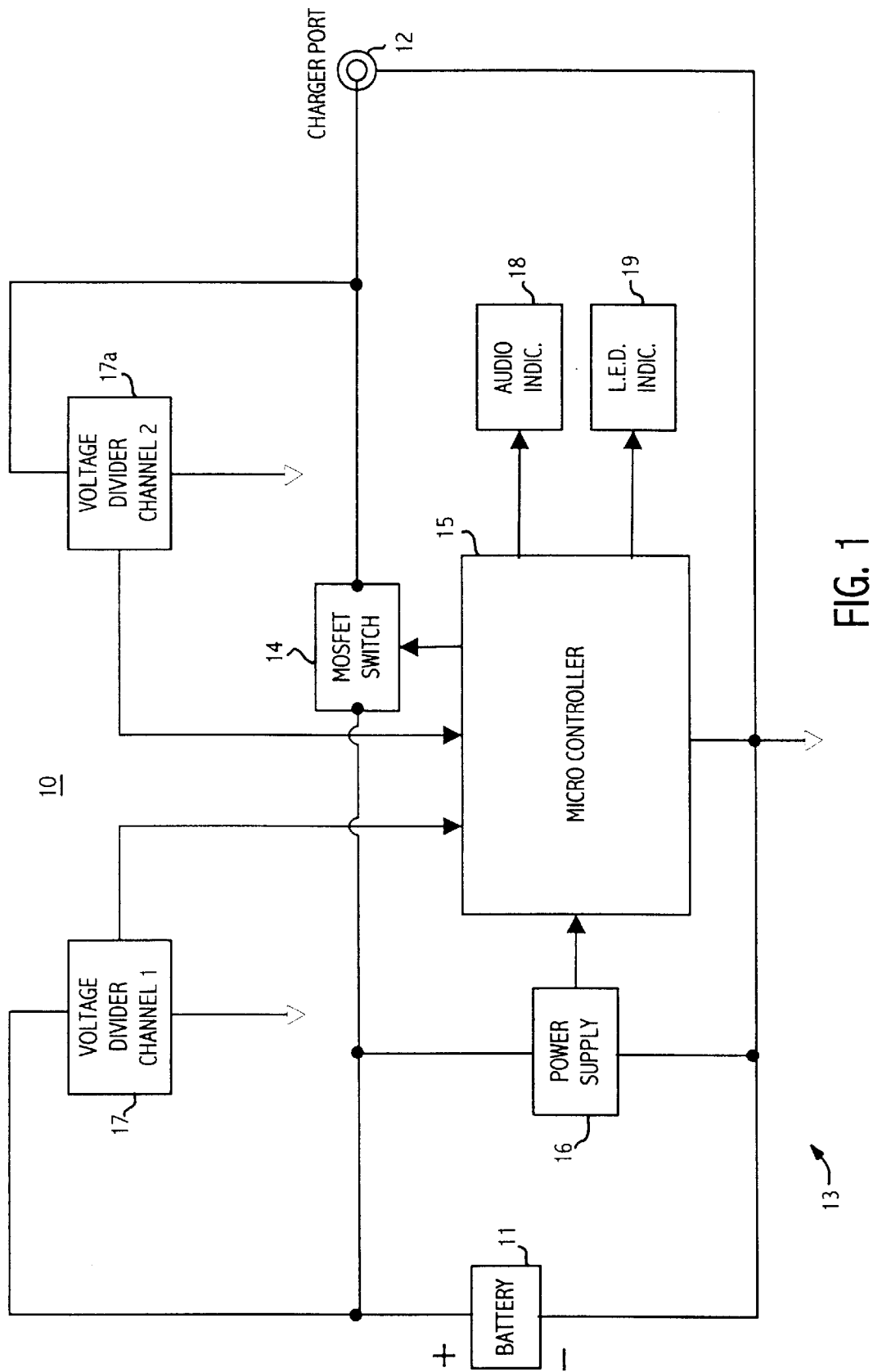
FIG. 1 is a functional block diagram of a battery pack incorporating a monitoring circuit in accordance with the present invention.

Referring to FIG. 1, there is illustrated a jump-starting battery pack, generally designated by the numeral 10, which includes a lead-acid storage battery 11, preferably of the thin metal film type, and a charger port 12 adapted for connection to an associated external charging system. The port 12 may be in the form of a coaxial jack adapted to receive an associate plug, which may be coupled to a stand-alone charger or to a cigarette lighter adapter plug which can be plugged into the cigarette lighter of an associated vehicle for using the vehicle's charging system. It will also be appreciated that the battery pack 10 is provided with a pair of battery clamp cables (not shown) in a known manner for coupling to the battery of a vehicle to be jump started. It will further be understood that the battery pack 10 could be recharged by use of the vehicle's charging system by leaving the battery pack connected to the vehicle battery after the vehicle has been jump-started.

The battery pack 10 also includes a battery monitoring circuit 13. In this regard, one terminal of the charger port 12 is connected directly to the ground or negative terminal of the battery 11, and the other terminal of the charger port 12 is connected through a charge enable switch 14 to the positive terminal of the battery 11. The switch 14 is an electronic switch, and may be a MOSFET operating under control of a microcontroller 15 which, in turn, operates under stored program control. A suitable power Supply 16 is connected across the battery 11 and generates a suitable supply voltage for powering the microcontroller 15. The positive terminals of the battery 11 and the charger port 12 are, respectively, connected to the microcontroller 15 through voltage dividers 17 and 17a. The microcontroller 15 is also coupled to an audio indicator 18, which may be in the form of a beeper, and a visual indicator, which may be an LED indicator 19, and may include plural LEDs.

It can be seen that the microcontroller 15 continuously monitors the voltage of the battery 11 and the voltage at the charger port 12. It is a fundamental aspect that the battery monitoring circuit 13 will automatically use these voltage measurements to alert the user to low-voltage battery conditions which require charging attention. The system will also provide visual confirmation to the user when the unit is being properly charged. The switch 14 and the microcontroller 15 cooperate to form a control circuit which automatically adjusts the charging rate based on the difference between the monitored voltages.

Figure 2:
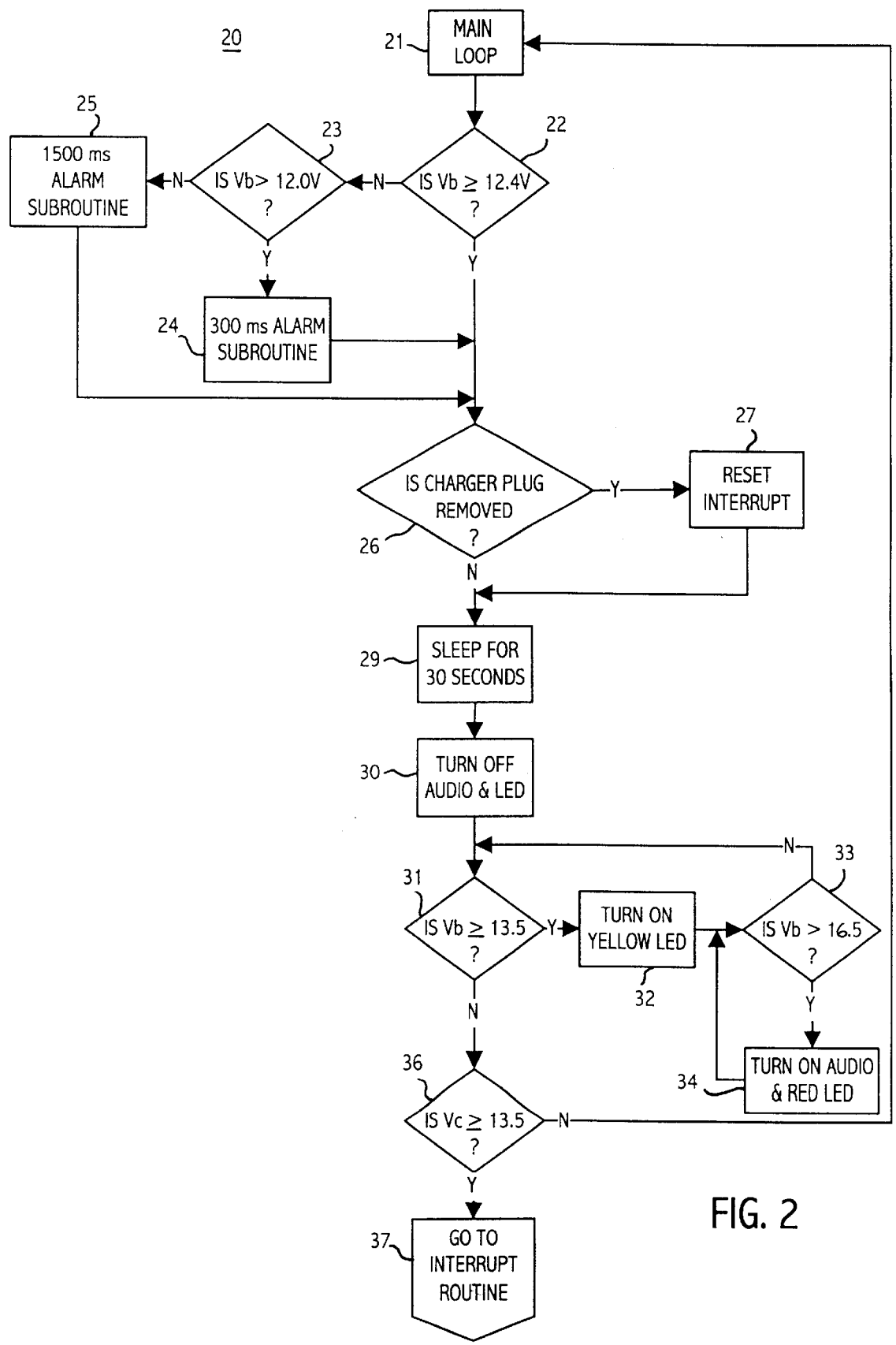
FIG. 2 is a flow chart of the main loop of a software program for operating the microcontroller of the monitoring circuit of FIG. 1.
Figure 3A:
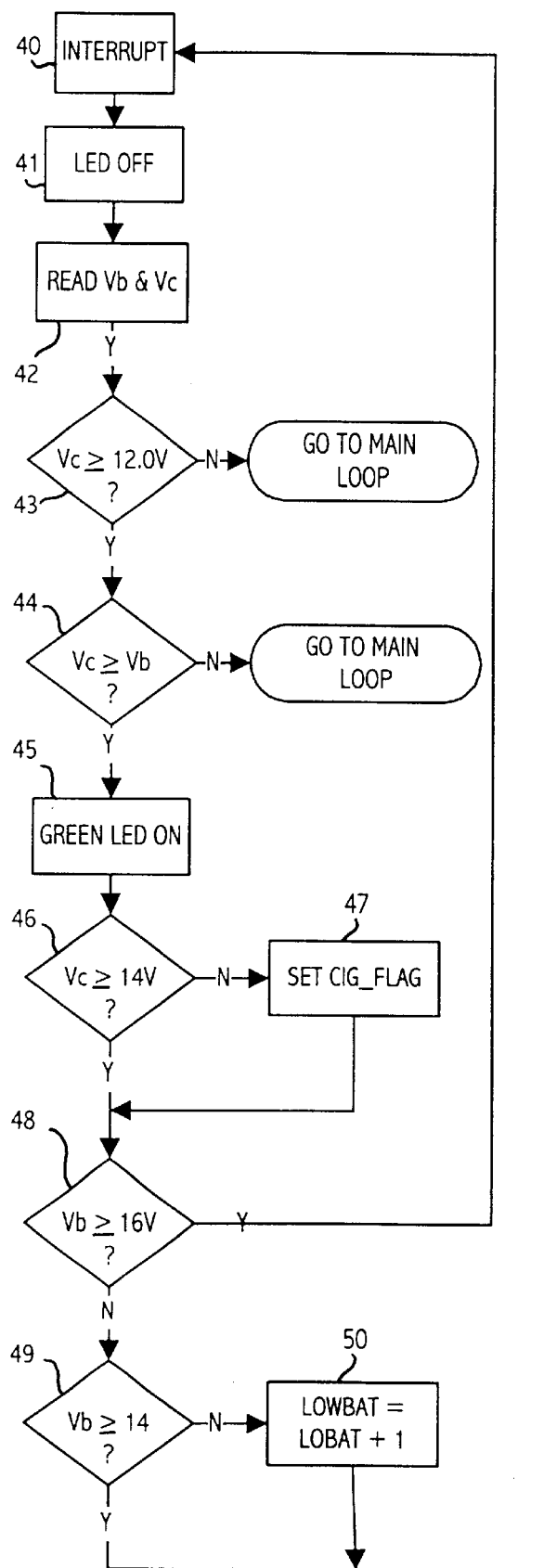
FIG. 3 is a flow diagram of an interrupt routine of the program software for the microcontroller of the monitoring circuit of FIG. 1.
Figure 3A:
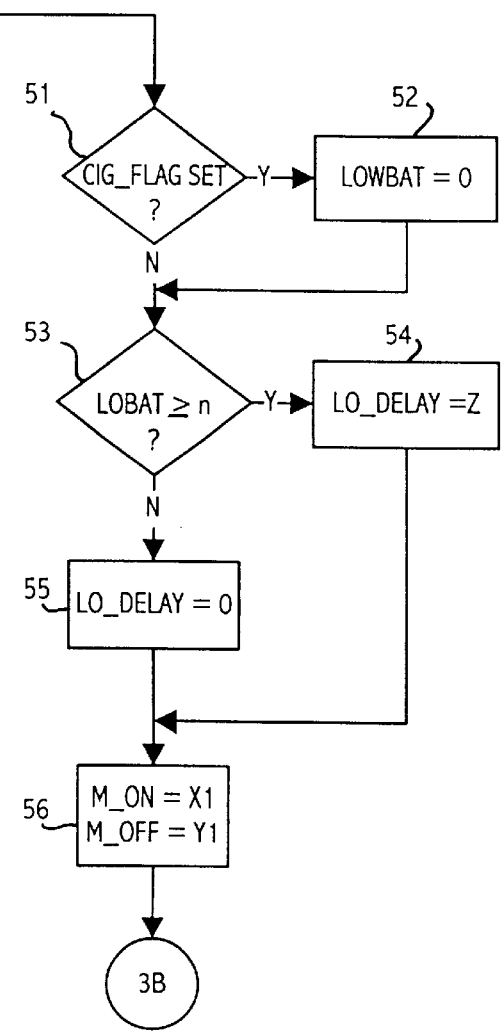
Figure 3B:
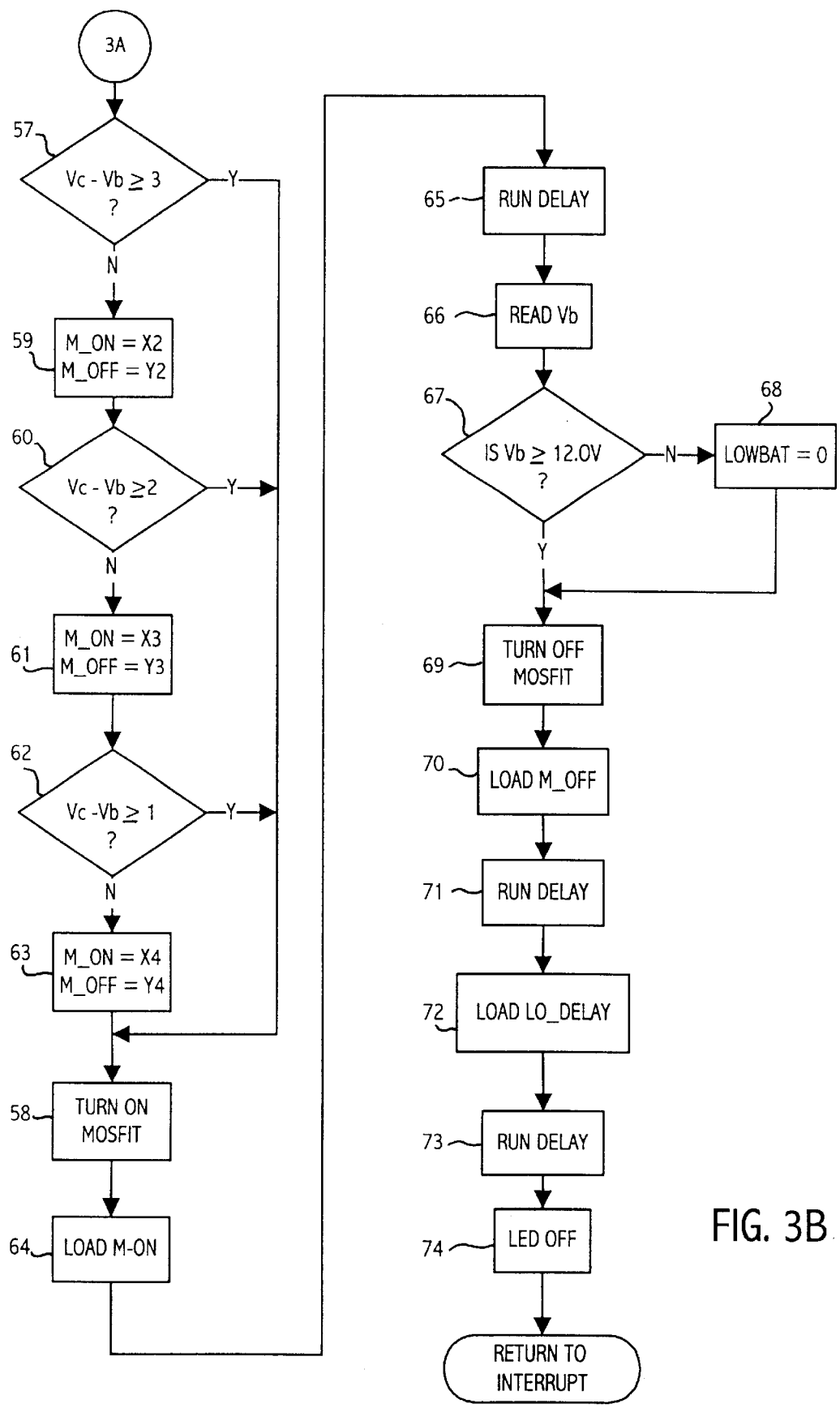

Referring to FIGS. 2 and 3, there is illustrated a flow chart 20 for the program which controls the operation of the microcontroller 15. The program has a main loop, shown in FIG. 2, which is entered at 21, and which first checks at 22 to see if the battery voltage ($V_b$) is greater than or equal to 12.4 volts, the minimum acceptable voltage level for use in jump-starting an automotive vehicle. If the voltage is below this level, the program next checks at 23 to see if the battery voltage is greater than or equal to 12.0 volts. If it is, the program then, at 24, initiates a subroutine for sounding a 300-ms alarm which causes the audio indicator 18 to generate an audible beep and the LED indicator 19 to activate a red LED for a 300-ms pulse duration, every 30 seconds, to signal the operator that the battery pack needs recharging. If, at 23, the battery voltage is less than 12.0 volts, the program then, at 25, activates a 1500-ms alarm subroutine, which causes the audio indicator 18 to send an audible beep and the LED indicator 19 to energize the red LED for a pulse of 1.5 seconds duration, every 30 seconds, to indicate to the user that the storage battery 11 needs immediate recharging.

After answering the query at 22, the program moves to 26 to check to see if the charger plug has been removed from the charger port 12. If so, the program then, at 27, resets an interrupt flag, allowing subsequent interrupts to be recognized, and then moves to 29 to enter a sleep mode for 30 seconds, in which the microcontroller 15 is powered down. If, at 26, the charger plug has not been removed, the program moves immediately to 29. The sleep mode is for battery conservation purposes. In the sleep mode the microcontroller draws a negligible current in the micro ampere range and, when powered up, the microcontroller 15 requires only a fraction of a second to traverse the main loop of the program. Thus, the battery monitoring circuit 13 draws appreciable power for only a very small fraction of the time so as to cause a negligible drain on the battery 11.

After the sleeping period, the program, at 30, turns off the audio and LED indicators 18 and 19 and then, at 31, checks to see if the battery voltage is greater than or equal to 13.5 volts. If it is, this indicates that the battery pack is being charged, because normally the voltage of a fully-charged battery pack will not exceed about 13 volts. The program then, at 32, activates the indicator 19 to turn on a yellow LED to signify that charging is occurring and then, at 33, checks to see if the battery voltage is greater than or equal to 16.5 volts, indicating an overvoltage condition. If so, it turns on a red LED and an audio indication at 34 and returns to 33. If, at 33, the battery voltage is less than 16.5 volts, the program returns to 31. If, at 31, the battery voltage is less than 13.5 volts, the program checks at 36 to see if the voltage VC at the charging port is greater than or equal to 13.5 volts, i.e., a voltage sufficient for charging the battery. If it is not, indicating that there is no external charging device connected, the program returns to the beginning of the main loop 21 and, if it is, indicating that an external charge device is connected to the charger port 12, the program proceeds at 37 to the INTERRUPT routine of FIG. 3. The INTERRUPT routine is used only when an external charging method, such as the cigarette adapter or a stand-alone charger is detected.

The INTERRUPT routine is entered at 40 and, at 41, turns off the LED indicator 19 and then, at 42, reads the battery voltage $V_b$ and the voltage $V_c$ at the charger port. The routine then, at 43, checks to see if $V_c$ is greater than or equal to 12.0 volts, to determine whether or not a charger is connected to the charger port 12. If not, the routine returns to the main loop at 21. If the charger voltage is not less than 12.0 volts, the routine next, at 44, checks to see if it is greater than or equal to the battery voltage. If not, the charger will be incapable of charging the battery and the routine again returns to the main loop. If, at 44, the charger port voltage is greater than or equal to the battery voltage, the routine turns on the green LED at 45 and then checks, at 46, to see if $V_c$ is greater than or equal to 14 volts. If not, this indicates that the cigarette adapter is probably being used for charging, because the vehicle alternator output may never get higher than about 14 volts. Thus, the routine would then set the CIG flag at 47 and then, at 48, check to see if the battery voltage is greater than or equal to 16 volts. If, at 46, the charger voltage is not less than 14 volts, the routine proceeds immediately to 48.

If at 48, the battery voltage is not less than 16 volts, this signifies that the battery is fully charged and the program returns to the beginning of the INTERRUPT routine at 40. The program will continue cycling between 40 and 48 until such time as the external charger is disconnected from the charger port 12 or the battery voltage drops below 16 volts. In the latter case, the program will drop to 49, to check to see if the battery voltage is greater than or equal to 14 volts. If not, the routine then, at 50, increments a LOWBAT register by one and then proceeds to 51 to check to see if the CIG flag is set. If, at 49, the battery voltage is greater than or equal to 14 volts, the routine proceeds immediately to 51. If, at 51, the CIG flag is set, indicating that charging is through the cigarette adapter, the routine resets the LOWBAT registered to 0 at 52, since the test for a low battery condition cannot be conducted because charging through the cigarette adapter cannot maintain sufficiently high voltage for that test. The program then moves to 53 to check to see if the LOWBAT value is greater than or equal to n, a number corresponding to a predetermined time period, which may be about 1 hour, signifying that the low battery voltage condition has persisted during charging for a sufficiently long period of time to indicate that the battery is not properly accepting a charge and may have a shorted cell. If so, the routine, at 54, sets a LO_DELAY register to a value of Z. Otherwise, the LO_DELAY value is set to 0 at 55. If, at 51, the CIG flag was not set, the routine would proceed immediately to 53.

After the LO_DELAY value has been set, the routine then, at 56, sets an M_ON register value to X1 and an M_OFF register value to Y1, the X1 and Y1 values corresponding to time periods respectively designating the on and off periods for the MOSFET switch 14. In other words, the duty cycle of the MOSFET switch is set at a first base value. Then, at 57, the routine checks to see if the difference between the voltage of the charger port and the battery voltage is greater than or equal to 3 volts. If so, it turns on the MOSFET switch at 58. If, at 57, the charger voltage does not exceed the battery voltage by at least 3 volts, the routine then, at 59, resets the M_ON and M_OFF register values, respectively to X2 and Y2, setting a slightly larger duty cycle, and then checks at 60 to see if the charger voltage exceeds the battery voltage by at least 2 volts. If so, it turns on the MOSFET at 58 and, if not, at 61 again resets the M_ON and M_OFF values to X3 and Y3, respectively, setting a still longer duty cycle, and then checks at 62 to see if the charger voltage exceeds the battery voltage by at least 1 volt. If so, it turns on the MOSFET at 58 and, if not, again resets the MOSFET on and off time values to X4 and Y4, respectively, at 63, before turning on the MOSFET. Accordingly, it will be appreciated that the duty cycle of the MOSFET switch 14 is automatically adjusted, depending upon the magnitude of the difference between the charger and battery voltages, to assure efficient battery charging without risking blown fuses or other circuit damage.

After the MOSFET switch is turned on, the routine, at 64, loads the M_ON value and runs that delay period at 65, holding the MOSFET switch closed for the prescribed on time period of the duty cycle, and then reads the battery voltage at 66. The routine, then, at 67, checks to see if the battery voltage is greater than or equal to 12.0 volts. If not, it sets the LOWBAT value to 0 at 68 and then turns off the MOSFET switch at 69. If the battery voltage is greater than or equal to 12 volts at 67, the MOSFET switch is turned off immediately at 69. Then the routine loads the M_OFF value at 70 and runs that delay time at 71 for holding the MOSFET switch open for the prescribed off time period of the duty cycle. Then, at 72, it loads the LO_DELAY value at 72 and runs that delay time at 73 before turning off the LED indicator 19 at 74 and returning to the beginning of the INTERRUPT routine at 40. If the battery is accepting a charge the LO_DELAY value will be 0 and will have no effect on the switch duty cycle, but if a bad battery condition has been detected, the LO_DELAY value Z will be added to the switch off time, reducing its duty cycle to the equivalent of a trickle charge. Accordingly, it can be seen that the routine effectively measures the time that it takes for the battery to charge from 12.0 volts to 14 volts, and if that time is at least the value represented by n, signifying a bad battery, the duty cycle of the switch will be reduced to a trickle charge level.

From the foregoing, it can be seen that the battery pack will enter the INTERRUPT routine only when charging is being effected through the charger port 12 and will continue to cycle through the INTERRUPT routine continuously until voltage at the charger port falls below battery voltage or below 12 volts, whereupon return to the main loop will be signaled to the user by the fact that the green LED is turned off. If charging is through the cigarette lighter adapter, charging will be discontinued when the vehicle engine is turned off. This may not be the case if charging is being affected through a stand-alone charger, but when the battery is fully charged, such chargers automatically revert to a trickle charge mode, which can be maintained indefinitely without damage to the battery.

Thus, it can be seen that there has been provided an improved monitoring circuit for a jump-starting battery pack which automatically continuously monitors the battery voltage and the voltage at a charging port, automatically adjusts charging rate depending on battery voltage, and automatically provides audible and/or visible indications of battery voltage level, charging condition and bad battery.

The matter set forth in the foregoing description and accompanying drawings is offered by way of illustration only and not as a limitation. While a particular embodiment has been shown and described, it will be obvious to those skilled in the art that changes and modifications may be made without departing from the broader aspects of applicants' contribution. The actual scope of the protection sought is intended to be defined in the following claims when viewed in their proper perspective based on the prior art.

We claim:

1. A battery pack comprising:

a battery, a charger port adapted to be coupled to an associated charging system, and a control circuit coupled to the charger port and to the battery for separately monitoring battery voltage and voltage at the charger port and responsive to the monitored voltages for controlling charging of the battery from the charger port, the control circuit including an electronic switch for coupling the charger port to the battery, and a processor coupled to the switch and operating under stored program control for controlling the operation of the switch in response to the monitored voltages, the processor program including a routine for comparing the battery voltage with the voltage at the charger port and for adjusting the duty cycle of the switch in accordance with the magnitude of the difference between the voltage at the charger port and the battery voltage.

2. The battery pack of claim 1, and further comprising an annunciator for indicating voltage conditions.

3. The battery pack of claim 2, wherein the annunciator includes a visible indicator.

4. The battery pack of claim 2, wherein the annunciator includes an audible indicator.

5. The battery pack of claim 1, wherein the switch is a MOSFET switch.

6. The battery pack of claim 1, wherein the processor includes a program routine which prevents charging of the battery unless the voltage of the charger port is at least at a predetermined level and is equal to or greater than the battery voltage.

7. The battery pack of claim 1, wherein the control circuit includes a circuit for producing a signal when the battery voltage is at least at a predetermined level.

8. The battery pack of claim 1, wherein the battery is a lead-acid battery.

9. A battery pack comprising:

a battery, a charger port adapted to be coupled to an associated charging system, and a control circuit coupled to the charger port and to the battery for separately monitoring battery voltage and voltage at the charger port and responsive to the monitored voltages for controlling charging of the battery from the charger port, the control circuit including an electronic switch for coupling the charger port to the battery, and a processor coupled to the switch and operating under stored program control for controlling the operation of the switch in response to the monitored voltages, the processor program including a routine to determine whether or not a cigarette lighter adapter is connected to the charger port.

10. The battery pack of claim 9, wherein the processor program includes a routine for determining whether or not the battery is accepting a charge, and for disabling that routine when a cigarette lighter adapter is connected to the charger port.

11. A battery pack comprising:

a battery, a charger port adapted to be coupled to an associated charging system, and a control circuit coupled to the charger port and to the battery for separately monitoring battery voltage and voltage at the charger port and responsive to the monitored voltages for controlling charging of the battery from the charger port, the control circuit including a processor operating under stored program control, the program including a routine which measures the time required for the battery voltage to be raised from a first predetermined level to a second predetermined level and for providing a signal when the measured time period is at least a predetermined time.

12. The battery pack of claim 11, wherein the control circuit includes a switch coupled between the battery and the charger port and connected to the processor, the processor program including a routine which reduces the duty cycle of the switch to a trickle charge level if the measured time period is equal to or greater than the predetermined time period.

* * * * *